United States Patent
Nenninger

(10) Patent No.: US 7,302,332 B2
(45) Date of Patent: Nov. 27, 2007

(54) METHOD AND DEVICE FOR DAMPING PENDULUM OSCILLATIONS OF A TRAILER

(75) Inventor: Gero Nenninger, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 699 days.

(21) Appl. No.: 10/856,060

(22) Filed: May 28, 2004

(65) Prior Publication Data

US 2004/0249547 A1 Dec. 9, 2004

(30) Foreign Application Priority Data

Jun. 3, 2003 (DE) ............... 103 24 965
Mar. 3, 2004 (DE) ............ 10 2004 010 296

(51) Int. Cl.
*B60T 8/24* (2006.01)
(52) U.S. Cl. ............... 701/72; 701/70; 701/71
(58) Field of Classification Search .......... 701/70, 701/71, 72; 303/140
See application file for complete search history.

(56) References Cited

U.S. PATENT DOCUMENTS

| | | | |
|---|---|---|---|
| 3,908,782 A | 9/1975 | Lang et al. | |
| 4,023,864 A | 5/1977 | Lang et al. | |
| 4,232,910 A | 11/1980 | Snyder | |
| 5,747,683 A * | 5/1998 | Gerum et al. ............... 73/118.1 |
| 6,516,260 B2 * | 2/2003 | Wetzel et al. ............... 701/50 |
| 6,523,911 B1 * | 2/2003 | Rupp et al. ............... 303/7 |
| 6,600,974 B1 * | 7/2003 | Traechtler ............... 701/1 |
| 2001/0018630 A1 * | 8/2001 | Wetzel et al. ............... 701/70 |

FOREIGN PATENT DOCUMENTS

| | | |
|---|---|---|
| DE | 197 08 144 | 9/1998 |
| DE | 198 10 642 | 9/1999 |
| DE | 199 64 048 | 1/2001 |
| DE | WO 01/02228 A1 * | 1/2001 |

* cited by examiner

*Primary Examiner*—Khoi H. Tran
*Assistant Examiner*—Sesna Sam
(74) *Attorney, Agent, or Firm*—Kenyon & Kenyon LLP

(57) ABSTRACT

A method for stabilizing a vehicle combination composed of a towing vehicle and a trailer or semitrailer, in which when a snaking motion of the trailer or semitrailer is detected, braking interventions are implemented for damping the snaking motion, in which symmetrical braking interventions are implemented first, and asymmetrical braking interventions are implemented if the desired subsidence behavior of the snaking motion is not achieved through the symmetrical braking interventions.

7 Claims, 1 Drawing Sheet

METHOD AND DEVICE FOR DAMPING PENDULUM OSCILLATIONS OF A TRAILER

FIELD OF THE INVENTION

The present invention relates to a method and a device for damping pendulum oscillations of a trailer.

BACKGROUND INFORMATION

German patent publication no. 199 64 048 refers to a method and a device for stabilizing a road vehicle. The road vehicle in particular is a passenger vehicle having a trailer towed by the vehicle. The vehicle is monitored with respect to snaking motion. When a snaking motion is detected, a yaw torque is automatically imparted to the vehicle, essentially in phase opposition to the snaking motion.

SUMMARY OF THE INVENTION

The exemplary method of the present invention relates to a method for stabilizing a vehicle combination composed of a towing vehicle and a trailer or semitrailer, in which when a snaking motion of the trailer or semitrailer is detected, braking interventions are implemented for damping the snaking motion.

With the exemplary embodiment and/or exemplary method of the present invention:
symmetrical braking interventions with respect to the wheels of at least one axle are implemented first, and
asymmetrical braking interventions with respect to the wheels of at least one axle are implemented if the desired subsidence behavior of the snaking motion is not achieved through the symmetrical braking interventions.

Thus the towing vehicle is stabilized more rapidly than would be possible merely by reducing the vehicle speed by uniform active braking of all four wheels. The term symmetrical braking interventions with respect to the wheels of at least one axle is understood to mean that both wheels of one axle are braked to equal amounts; for example, pressure is applied by the brake linings on the brake disks with equal intensity. In the case of asymmetrical braking interventions with respect to the wheels of at least one axle, the two wheels on the axle are braked to different amounts. This results in a yaw torque on the vehicle (with the same coefficient of friction of the road surface on both sides of the vehicle).

The desired subsidence behavior of the snaking motion is given by an extrapolated setpoint curve of a differential variable over time. At least one transverse dynamic vehicle variable enters into the differential variable.

This allows for predetermining a setpoint subsidence behavior of the oscillation. The differential variable may be composed, for example, of the difference between a transverse dynamic vehicle variable and a driver's intent variable (e.g., setpoint yaw rate). Instead of the differential variable, a transverse dynamic variable (e.g., the actual yaw rate) may also be taken into account.

In an exemplary embodiment and/or exemplary method of the present invention, the extrapolated differential variable is a subsidence curve for the yaw rate amplitude, i.e.:
the differential variable is the differential amplitude which results as the amplitude of the difference between the setpoint yaw rate and the actual yaw rate,
the extrapolated setpoint curve is a setpoint subsidence curve for the differential amplitude.

The yaw rate amplitude is a measure that is relatively simple to determine for the intensity of the snaking motion. A yaw rate sensor is already provided as standard in many modern vehicles.

An exemplary embodiment and/or exemplary method of the present invention provides that:
the setpoint subsidence curve for the differential amplitude is determined starting from and/or as a function of an estimated maximum value for the differential amplitude,
the estimated maximum value either prevailing at the time of detection of a snaking state of the vehicle which requires damping or it is determined at this point in time.

The estimated maximum value offers the possibility in particular of considering the worst case.

An exemplary embodiment and/or exemplary method of the present invention provides that a system deviation is determined which is obtained as the difference
between the (instantaneous) yaw rate difference (BPAus) which is obtained as the difference between the instantaneous actual yaw rate and the instantaneous setpoint yaw rate
and the value of the differential variable extrapolated with the extrapolated characteristic over time for the instantaneous point in time, and asymmetrical braking interventions are implemented if the absolute value of the system deviation exceeds a predetermined first limiting value.

It is thus possible to determine easily whether the yaw rate is in a critical range or has assumed critical values.

An exemplary embodiment and/or exemplary method of the present invention provides that the asymmetrical braking interventions are terminated when the absolute value of the system deviation again falls below another predetermined limiting value. This prevents unnecessary asymmetrical braking interventions.

An exemplary embodiment and/or exemplary method of the present invention provides that a setpoint yaw torque which is to be applied through the asymmetrical braking intervention is determined from the system deviation. The required braking intensity for the asymmetrical braking intervention may be determined from this setpoint yaw torque.

An exemplary embodiment and/or exemplary method of the present invention provides that the system deviation is used to determine the side of the vehicle on which the asymmetrical braking intervention should be performed. The plus or minus sign of the system deviation, for example, may be used for this purpose.

An exemplary embodiment and/or exemplary method of the present invention provides that a prevailing snaking motion is recognized on the basis of the analysis of the curve of a differential variable over time, at least one transverse dynamic driving dynamics variable entering into this differential variable.

The exemplary device according to the present invention for stabilizing a vehicle combination having a towing vehicle and a trailer or semitrailer contains a braking arrangement with which braking interventions are implemented for damping the snaking motion when a snaking motion of the trailer or semitrailer is detected.

The exemplary device according to the present invention provides a braking arrangement so that symmetrical braking interventions are implemented first, and asymmetrical braking interventions are implemented if the desired subsidence behavior of the snaking motion is not achieved by the symmetrical braking interventions.

DETAILED DESCRIPTION

In the case of a vehicle combination, snaking motion may occur (e.g., due to a side wind) where the trailer oscillates about its vertical axis and also induces oscillations in the towing vehicle via the trailer towing device. If driving speed v is below a critical speed vkrit, these oscillations are damped; at v=vkrit they are not damped and at v>vkrit the oscillations increase. The value of the critical speed depends, among other things, on geometric data such as the wheelbase, the towbar length, inclined position rigidities of the axles, mass and yaw moment of inertia of the vehicle and trailer. In the case of passenger vehicle combinations, this is typically in the range of 90 km/h to 130 km/h.

The snaking motion of the vehicle combination reflects a periodic oversteering of the towing vehicle. The goal is to counteract this behavior by applying defined braking torques to individual wheels which cause yaw torques in the opposite direction from the oversteering.

The braking intervention here includes two components:

Component 1:

Symmetrical braking interventions on all four wheels of the vehicle are used as a measure against the snaking motion. The speed of the vehicle in particular is to be lowered below the critical vehicle speed.

Component 2:

Alternatively or additionally and/or superimposed on the symmetrical braking interventions, asymmetrical braking interventions are implemented on just one side of the vehicle for the case when the symmetrical interventions do not yield the desired damping of the snaking motion. All the wheels on one side of a vehicle or just one wheel on one side of the vehicle may be braked.

Through the exemplary embodiment and/or exemplary method of the present invention, a suitable setpoint value for the behavior of the pendulum oscillation during the symmetrical braking intervention is determined and the system deviation based thereon is calculated. The required braking torques on the individual wheels are then determined from this system deviation. These braking torques generate a yaw torque which counteracts the yaw movement of the towing vehicle and thus the yaw movement of the vehicle combination. The towing vehicle therefore becomes stabilized more rapidly than may be possible by reducing the vehicle speed merely by active braking of all four wheels.

Figure 1:
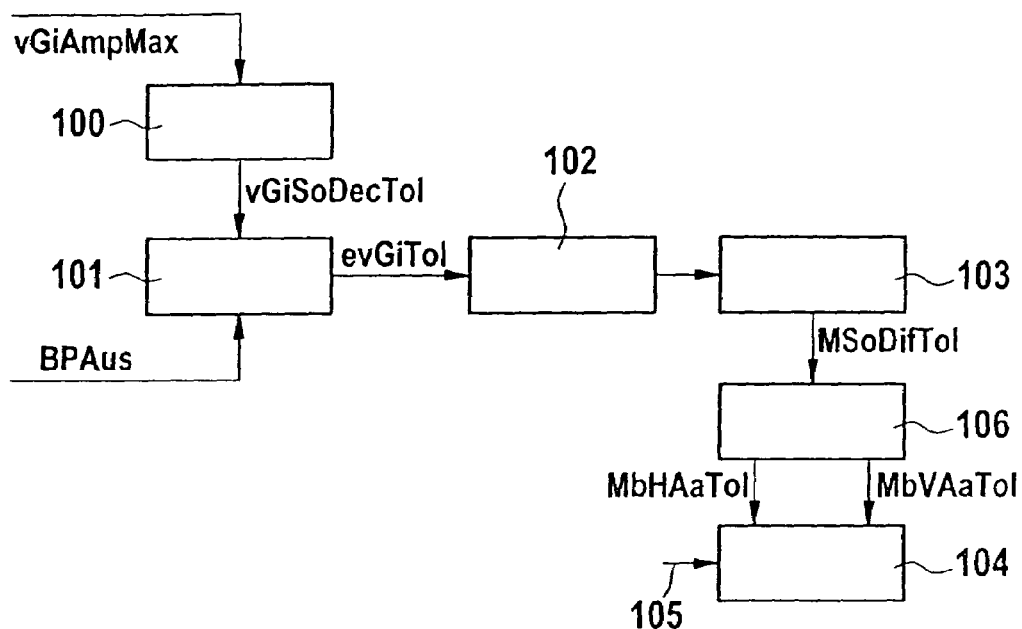
FIG. 1 shows a flow chart of the exemplary method according to the present invention.

The exemplary method according to the present invention is depicted in FIG. 1. The following two input variables are taken into account here:

the estimated maximum value of differential amplitude vGiAmpMax and yaw rate difference BPAus (possibly filtered, in particular bandpass filtered).

A feature of this exemplary embodiment is that the input variable is the difference between the actual yaw rate (as determined with a yaw rate sensor, for example) and the setpoint yaw rate (which represents the driver's intent and is often determined from the steering angle, the vehicle speed and additional variables that are assumed to be constant such as the characteristic speed according to the single-track model). In other words, the differential amplitude is the amplitude of the difference between the actual yaw rate and the setpoint yaw rate. Accordingly, yaw rate difference BPAus is the difference between the actual yaw rate and the setpoint yaw rate.

In block 100 the desired subsidence curve, i.e. desired subsidence behavior vGiSoDecTol for the differential amplitude of the snaking motion during the phases of symmetrical braking is determined from variable vGiAmpMax.

The system deviation is then determined in block 101 by forming the difference between vGiSoDecTol and BPAus. If the absolute value of the yaw rate difference exceeds the maximum amplitude predetermined by vGiSoDecTol, system deviation evGiTol is then calculated in block 101. To avoid very short superimposed asymmetrical braking interventions toward the end of the stabilization phase, variable evGiTol is reduced by a dead zone in block 102.

It is possible with the dead zone in block 102 in particular to generate a hysteresis response with respect to the asymmetrical braking intervention, i.e., the asymmetrical braking intervention begins when the system deviation and/or its absolute value exceeds a first limiting value and the asymmetrical braking intervention is terminated only when the system deviation and/or its absolute value falls below a second limiting value. The second limiting value may be different from the first limiting value and in particular the second limiting value may be lower than the first limiting value.

On the basis of the resulting system deviation, yaw torque MsoDifTol is determined with the help of a proportional gain factor. In block 106 this yaw torque is then converted into braking torques MbVAaTol on the front axle and MbHAaTol on the rear axle and then in block 104 distributed to the left and right wheels of the axles, respectively, whose active braking counteracts the snaking motion.

The influence of the trailer on the tire slip angle may be taken into account through the additional signals labeled as 105 in FIG. 1. The plus or minus sign of the tire slip angle in particular may be corrected.

Figure 2:
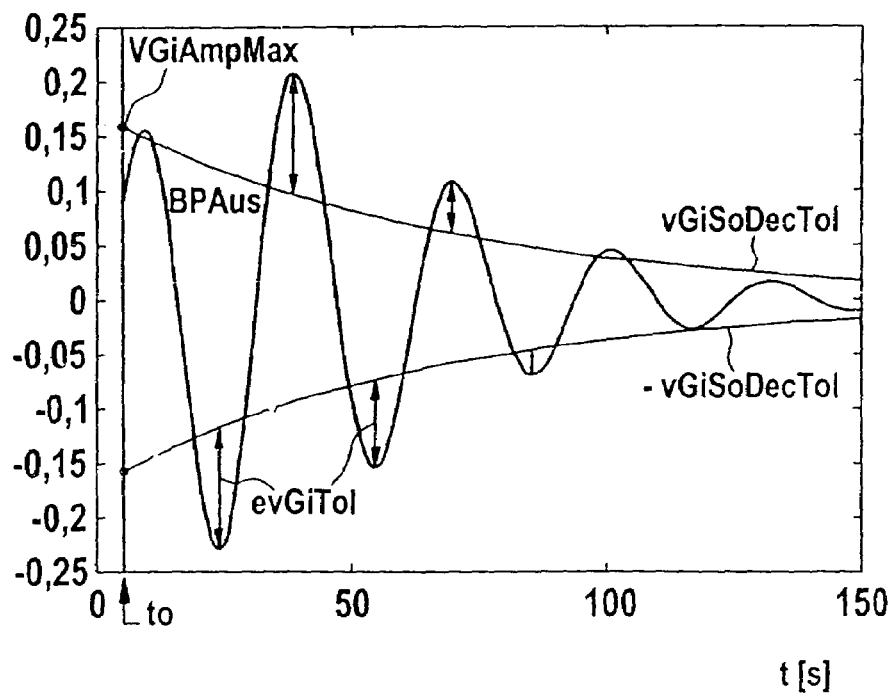
FIG. 2 shows the principle of forming the system deviation.

FIG. 2 illustrates the principle of forming the system deviation. Time t in seconds is plotted on the abscissa and a dimensionless variable which is a measure of the amplitude of the snaking motion is plotted on the ordinate.

Let us assume the existence of a snaking state which requires damping is detected at time t0. On the basis of determined prevailing maximum value vGiAmpMax of the differential amplitude, the desired subsidence curve, i.e., setpoint subsidence curve vGiSoDecTol, is determined such as that to be achieved through braking interventions.

At the same time, the curve of BPAus is determined from the yaw rate difference. If the BPAus value is outside of (i.e., above or below) the envelope curves predetermined by vGiSoDecTol, then an asymmetrical braking intervention is also superimposed on the (planned) symmetrical braking intervention (on the basis of which subsidence curve vGiSoDecTol was also determined).

BPAus may also be a "processed yaw rate difference" in particular a yaw rate difference filtered with a low-pass filter or a bandpass filter.

Detection of the snaking motion is thus based on analysis of the difference between the actual yaw rate and the setpoint yaw rate. The setpoint yaw rate includes in particular the driver's intent, e.g., via the steering angle.

What is claimed is:

1. A method for stabilizing a vehicle combination, including a towing vehicle and a trailer or semitrailer, the method comprising:

detecting a snaking motion of the trailer or semitrailer; and implementing braking interventions for damping the snaking motion, wherein symmetrical braking interventions with respect to the wheels of at least one axle are implemented first, and asymmetrical braking interventions with respect to the wheels of at least one axle are implemented if a predetermined setpoint subsidence behavior of the snaking motion is not achieved by the symmetrical braking interventions;

wherein the setpoint subsidence behavior of the snaking motion is given by a setpoint curve over time that is determined for a differential variable, into which there enters at least one transverse vehicle dynamic, wherein the differential variable is the differential amplitude which results as the amplitude of the difference between the setpoint yaw rate and the actual yaw rate, and the setpoint curve is a setpoint subsidence curve for the differential amplitude, and wherein the setpoint subsidence curve for the differential amplitude is determined by extrapolation over time as a function of an estimated maximum value for the differential amplitude, the estimated maximum value either prevailing at the time of detection of a snaking state of the vehicle which requires damping or it is determined at the time of detection.

2. A method for stabilizing a vehicle combination, including a towing vehicle and a trailer or semitrailer, the method comprising:

detecting a snaking motion of the trailer or semitrailer; and implementing braking interventions for damping the snaking motion, wherein symmetrical braking interventions with respect to the wheels of at least one axle are implemented first, and asymmetrical braking interventions with respect to the wheels of at least one axle are implemented if a predetermined setpoint subsidence behavior of the snaking motion is not achieved by the symmetrical braking interventions;

wherein:

a system deviation is determined which is obtained as the difference between the instantaneous yaw rate difference which is obtained as the difference between the instantaneous actual yaw rate and the instantaneous setpoint yaw rate, and the setpoint value of the differential variable derived from the setpoint curve over time for the instantaneous point in time, and asymmetrical braking interventions are implemented if an absolute value of the system deviation exceeds a predetermined first limiting value.

3. The method of claim 2, wherein the asymmetrical braking interventions are terminated when the absolute value of the system deviation again falls below a predetermined second limiting value.

4. The method of claim 2, wherein a setpoint yaw torque which is to be applied by the asymmetrical braking intervention is determined from the system deviation.

5. The method of claim 4, wherein the system deviation is used to determine the side of the vehicle on which the asymmetrical braking intervention should be performed.

6. The method of claim 1, wherein a prevailing snaking motion is recognized based on an analysis of the curve of a differential variable over time, at least one transverse dynamic vehicle variable entering into this differential variable.

7. A device for stabilizing a vehicle combination, including a towing vehicle and a trailer or semitrailer, comprising:

a detecting arrangement to detect a snaking motion of the trailer or semitrailer; and a braking arrangement to implement braking interventions for damping the snaking motion when the snaking motion of the trailer or semitrailer is detected, wherein symmetrical braking interventions with respect to the wheels of at least one axle are implemented first, and asymmetrical braking interventions with respect to the wheels of at least one axle are implemented if a predetermined setpoint subsidence behavior of the snaking motion is not achieved by the symmetrical braking interventions;

wherein the setpoint subsidence behavior of the snaking motion is given by a setpoint curve over time that is determined for a differential variable, into which there enters at least one transverse vehicle dynamic, wherein the differential variable is the differential amplitude which results as the amplitude of the difference between the setpoint yaw rate and the actual yaw rate, and the setpoint curve is a setpoint subsidence curve for the differential amplitude, and wherein the setpoint subsidence curve for the differential amplitude is determined by extrapolation over time as a function of an estimated maximum value for the differential amplitude, the estimated maximum value either prevailing at the time of detection of a snaking state of the vehicle which requires damping or it is determined at the time of detection.

* * * * *